United States Patent
Sladen

(10) Patent No.: US 6,885,398 B1
(45) Date of Patent: Apr. 26, 2005

(54) IMAGE SENSOR WITH COLOR FILTERING ARRANGEMENT

(75) Inventor: Peter Sladen, Hampshire (GB)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/470,621

(22) Filed: Dec. 22, 1999

(30) Foreign Application Priority Data

Dec. 23, 1998 (GB) .............................................. 9828544

(51) Int. Cl.⁷ .......................... H04N 5/335; H04N 9/68
(52) U.S. Cl. ........................ 348/273; 348/275; 348/234
(58) Field of Search ................................ 348/272, 235, 348/270, 271, 273, 275, 276, 277, 234, 279, 222.1, 274, 278, 280

(56) References Cited

U.S. PATENT DOCUMENTS

| | | | | |
|---|---|---|---|---|
| 4,047,203 A | * | 9/1977 | Dillon | 348/276 |
| 4,121,244 A | * | 10/1978 | Nakabe et al. | 348/276 |
| 4,500,914 A | * | 2/1985 | Watanabe et al. | 348/280 |
| 4,870,483 A | | 9/1989 | Nishigaki et al. | 358/44 |
| 4,939,573 A | * | 7/1990 | Teranishi et al. | 348/276 |
| 5,307,159 A | * | 4/1994 | Hieda | 348/235 |
| 5,778,106 A | * | 7/1998 | Juenger et al. | 382/275 |
| 6,714,243 B1 | * | 3/2004 | Mathur et al. | 348/273 |

FOREIGN PATENT DOCUMENTS

| | | |
|---|---|---|
| EP | 0077156 A1 | 4/1983 |
| EP | 0145297 A2 | 6/1985 |
| EP | 0228900 A2 | 7/1987 |
| EP | 0502539 A2 | 9/1992 |
| GB | 2033189 A | 5/1980 |
| GB | 1 575719 | 9/1980 |

* cited by examiner

*Primary Examiner*—Andrew Christensen
*Assistant Examiner*—Lin Ye
(74) *Attorney, Agent, or Firm*—Perman & Green, LLP

(57) ABSTRACT

This invention discloses a filter structure for a video image sensing device. The filter structure consists of a red colour filter and a blue colour filter and these are combined in a sensing block with non-colour or apertured windowed sensors i.e. grey sensors.

8 Claims, 2 Drawing Sheets

IMAGE SENSOR WITH COLOR FILTERING ARRANGEMENT

BACKGROUND OF THE INVENTION

The present invention relates to video image sensors, and more particularly to colour and light sensing in relation to such sensors.

Red, green and blue (RGB) are three primary additive colours whereby individual components are added together to form a desired colour and this format is the basic colour space model which is widely used throughout imaging. In particular, broadcast, video and imaging standards make use of RGB signals to derive luminance and colour difference video signals, such as YUV, YIQ or YCbCr colour spaces. Colour spaces are mathematical representations of a set of colours. In YUV, Y represents the black and white information in the video signal (i.e. luminance), and U and V represent the colour information in the video signal (i.e. chrominance). The basic equations for converting between RGB and YUV are:

$$Y = 0.299R + 0.587G + 0.114B$$

$$U = -0.147R - 0.289G + 0.436B$$

$$U = 0.492(B-Y)$$

$$V = 0.615R - 0.515G - 0.100B$$

$$V = 0.877(R-Y)$$

In YIQ colour space, I stands for in-phase and Q stands for quadrature, which is the modulation method used to transmit the colour information; YIQ can be derived from YUV. YCbCr is a scaled and offset version of the YUV colour space.

Currently, in known colour video sensing devices such as video cameras, black and white pixel sensors are adapted to read colour information by disposing colour filters over the sensors, which sensors typically are CCD or CMOS sensors. A standard arrangement is for the pixels to be grouped in 2×2 blocks, with diagonally opposite pixels being responsive to green light and the other two diagonally opposite pixels being responsive to blue and red light respectively. These are known as RGB filters. The reason why there are two green pixels is that more image information is present in green light.

It has been noted that a problem of using such an arrangement of RGB filters is that it introduces a light attenuation of approximately 50:1. The share of the pixels between green, blue and red filters means that there is only 25% of the black and white pixel sensors for each of the blue and red filters, and 50% for the green filters. The result is that the sensor loses a great deal of colour resolution. Attempts are made in the downstream processing of the sensor output to recover the original resolution and a common technique is interpolation of the sensor output information using complex proprietary algorithms. This in essence involves estimating by interpolation what the colour response might be at a given pixel location based on the sensor outputs from the pixels surrounding that given pixel. However, since interpolation is a very approximate calculation its effectiveness varies widely depending on the complexity of the algorithm.

In addition, use of RGB filters leads to a reduction in sensitivity. Furthermore, there is also a reduction in the spatial resolution of the sensor, RGB colour filtering reducing resolution approximately by a factor of four.

A solution to the problem of loss of sensitivity due to RGB filters is to increase the length of time that the sensors are exposed to the scene to be captured on video. However, the knock-on effect of this is that the camera is more susceptible to shaking, and also blurring due to subject movement is more likely to occur. This is a particularly marked problem for CMOS sensors which are of much lower sensitivity than CCD sensors. Also, since sensor noise is additive, longer exposure periods results in higher noise floor, and thus the image signal is swamped.

As mentioned previously, in general, resolution of the image is determined by interpolation. Since there are a greater number of pixels in the green colour band and since also green light contains greater image information, this is used to increase the effective resolution of red and blue sensors. The main problem with this technique is that it is highly dependent on the quality of the algorithm used and its complexity. Sometimes the quality of the red and blue information can be improved further using green information.

SUMMARY OF THE INVENTION

The present invention is based on the observation that the human eye is not as sensitive to colours as it is to brightness. In light of this observation, it is proposed that instead of at the pixel level having red, green and blue filters mapping onto respective pixels, certain of the colour pixels be replaced by so-called 'grey' filters in which there are no colour filters associated with such pixels. Accordingly, the present invention resides in an image sensing device having an array of image sensors and a filter structure disposed in relation to the image sensors, the filter structure comprising blocks of filter groups, each group having a combination of one or more areas adapted so as to allow light to pass therethrough onto corresponding image sensors with colour filtering, and one or more areas adapted so as to allow light to pass therethrough onto corresponding image sensors without colour filtering.

A key advantage of the present invention, is that because there are certain areas in the filter which will allow the incident light to pass through without any colour filtering, the attenuation of the light is greatly reduced and consequently sensitivity of the device is enhanced compared with known RGB filter image sensing devices.

A further advantage of the present invention is that it is better suited to image compression because it provides for better compatibility with such compression techniques. This is because image compression systems such as MPEG and JPEG have similar luminance and chrominance requirements to that output from the sensors of the present invention. In particular, such compression standards reduce chrominance, while sustaining the same level of luminance. Because the grey resolution and colour resolution of an image sensor of the present invention is designed to match those of MPEG and JPEG compression standards, the signals output from the sensors require a minimal amount of additional signal conditioning for JPEG and MPEG compression.

In the prior art, the sensors are in Beyer pattern and Beyer pattern causes image anomalies during conversion to RGB. At the pixel level these anomalies are not very significant because individual pixels are only marginally visible. However, when the image is enlarged, these anomalies are enlarged and spread over several pixels, thereby becoming more visible.

Since the format of the image sensor of the present invention is in line with DCT (discrete cosine transform)

based compression techniques, it will better scale when enlarged. Therefore, by means of the invention it is possible to use a lower pixel sensor count, and scale to produce similar quality to a larger pixel count Beyer sensor.

A further advantage is that since there is a direct measure of luminance by virtue of those areas of the filter where there are no colour filters, the grey pixels of the present invention offer a full resolution of the image and therefore there is a significant improvement in image quality.

Additionally the image sensor calculation of YUV is much simplified over known prior art systems.

BRIEF DESCRIPTION OF THE DRAWINGS

The present invention will now be described by way only of example with reference to the accompanying drawings in which.

DETAILED DESCRIPTION OF THE INVENTION

Figure 1:
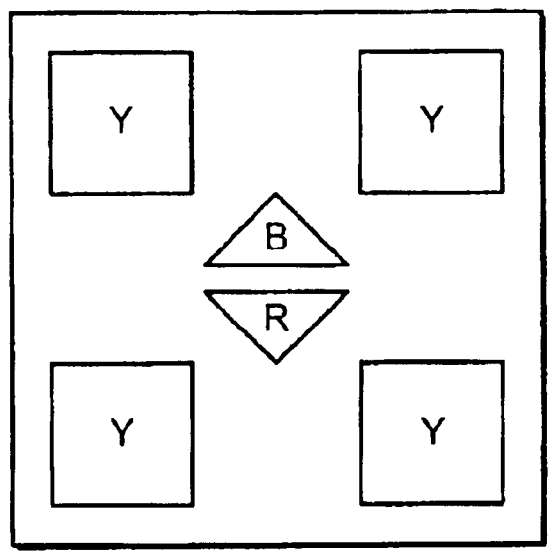
FIG. 1 schematically illustrates a first embodiment of the present invention.

Referring initially to FIG. 1, there is shown a filter group of a unitary block (10) from a repeating pattern of such blocks forming a filter structure in accordance with a first embodiment of the present invention. The filter structure is overlaid in relation to an array of pixel sensors of a video imaging device. The block (10) consists of six filter areas. Four of these are areas in which there are no colour filters overlaying the respective pixels and these are denoted Y (for ease of reference these will be referred to as grey sensors). There is one area denoted B which represents a blue filter and there is another area denoted R which represents a red filter. The Y areas conveniently are formed by apertured windows in the filter structure which align with respective pixels sensors. In this embodiment the Y areas are generally square, although rectangular and other shapes are equally permissible, and they are arranged spaced from one another in a generally square configuration. The blue and red filters are disposed centrally in relation to the four square grey sensors and conveniently are triangular in shape, although again other shapes are equally permissible.

The process involved in capturing a video image using the filter structure of the present invention begins by first starting exposure for the red and blue filters. As mentioned above, since chrominance filters are less sensitive to light than luminance filters it is necessary to expose them for longer exposure times than luminance filters. Sensor readings are then taken from the four grey sensors by sampling them. While reading the luminance response the chrominance filters are subjected to extended exposure time. Next, the red and blue pixels are sampled. This series of steps is repeated for each block and involves reading a row of pixel sensors, resetting and looping. Typically, the refresh rate is 30 frames per second and is sequential.

Since in known RGB arrangements the green filters occupy 50% of the filter space in a 2×2 block, it is proposed that in this embodiment the Y areas also occupy half of the filter space in a block, and because there are a group of four Y areas in each block, this can be expressed as fraction 4/8 of the overall filter space in each block. As there is no colour filtering in these Y areas the grey sensors are 50 times more sensitive and thus the overall sensitivity of the block is increased by 4/8×50 giving 25 times the sensitivity of prior art RGB filters. It should be mentioned that in order to achieve the same overall area of filter block as RGB filters, as there are four Y areas in place of two green filters, the size of each of the Y areas is reduced by 50% in comparison to green filters.

It was explained above that the blue and red pixels have four times the exposure time and this produces four times the amplitude. Effective sensitivity will therefore be increased fourfold and thus could allow for a reduction in filter size over known blue and red filters.

So for this embodiment, the relative areas are four Y areas each at 1/8 of the overall size, one blue at 2/8 of the overall area and one red pixel again at 2/8 of the overall area. YUV is then given by the following set of equations:

| | |
|---|---|
| Luminance for pixel 1 | Y1 = Grey1 − 2R − 3B |
| Luminance for pixel 2 | Y2 = Grey2 − 2R − 3B |
| Luminance for pixel 3 | Y3 = Grey3 − 2R − 3B |
| Luminance for pixel 4 | Y4 = Grey4 − 2R − 3B |
| Blue chrominance | U = 3B − (grey1 + grey2 + grey3 + grey4)/8 |
| Red chrominance | V = 6R − 0.9 × (grey1 + grey2 + grey3 + grey4)/4 |

The reduction in signal amplitude for red and blue pixels is not significant, with 1/6 of full scale 12 bit (256), providing A/D values 0 to 42; this is particularly so given that image compression algorithms reduce resolution below this during quantisation. However, to correct for this there could be an increase in size of red and blue pixels, and for example doubling their filter areas would increase A/D range to 84 and affect sensitivity by 16 times that of standard RGB filtered sensors.

The above estimates are model values ignoring fill factor, which is concerned with the amount of associated silicon in the sensor chip dedicated to processing and which will effectively reduce as a result of this method. If grey pixels are same size as black/white, and fill factor is 25% for the latter, then the table below outlines the unit area for each sensor block.

| | black/white | GreyRB |
|---|---|---|
| Pixels | 4 | 8 |
| Associated local circuitry | 12  1 | 8 |
| Total area for GreyRB | 16 | 26 |
| Absolute fill factor | 25% | 31% |
| Corrected fill factor* | 15% | |

*allowing for the fact that only four of the eight pixels are for luminance Therefore 25 fold increase in sensitivity is likely to be 15%/25% × 25 = 15:1 increase in sensitivity. The likely increase in silicon could be 26/16 times the size, ie. 62% larger. However, the sensor array is only around 50% of the total silicon area, and therefore this equates to a 31% area increase.

Figure 2:
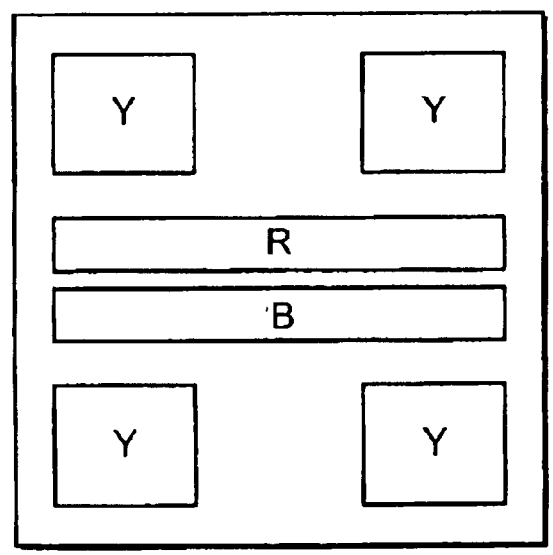
FIG. 2 schematically illustrates a second embodiment of the present invention.

FIG. 2 illustrates an alternative embodiment in which the red and blue filters of the block (20) are provided in strip like bands separating pairs of Y areas disposed above and below the bands. It is envisaged that the manufacture of such a filter structure would be much simplified because the ease of forming the red and blue bands would be increased because of less stringent alignment requirements of colour filters in relation to the pixel sensors. The manner in which this embodiment works is similar to the embodiment of FIG. 1, although because of the different filter structure the specific mathematics of the filter sizes and sensitivity calculations are different. Such calculations being readily derivable by those skilled in the art based on the equations provided above.

Figure 3:
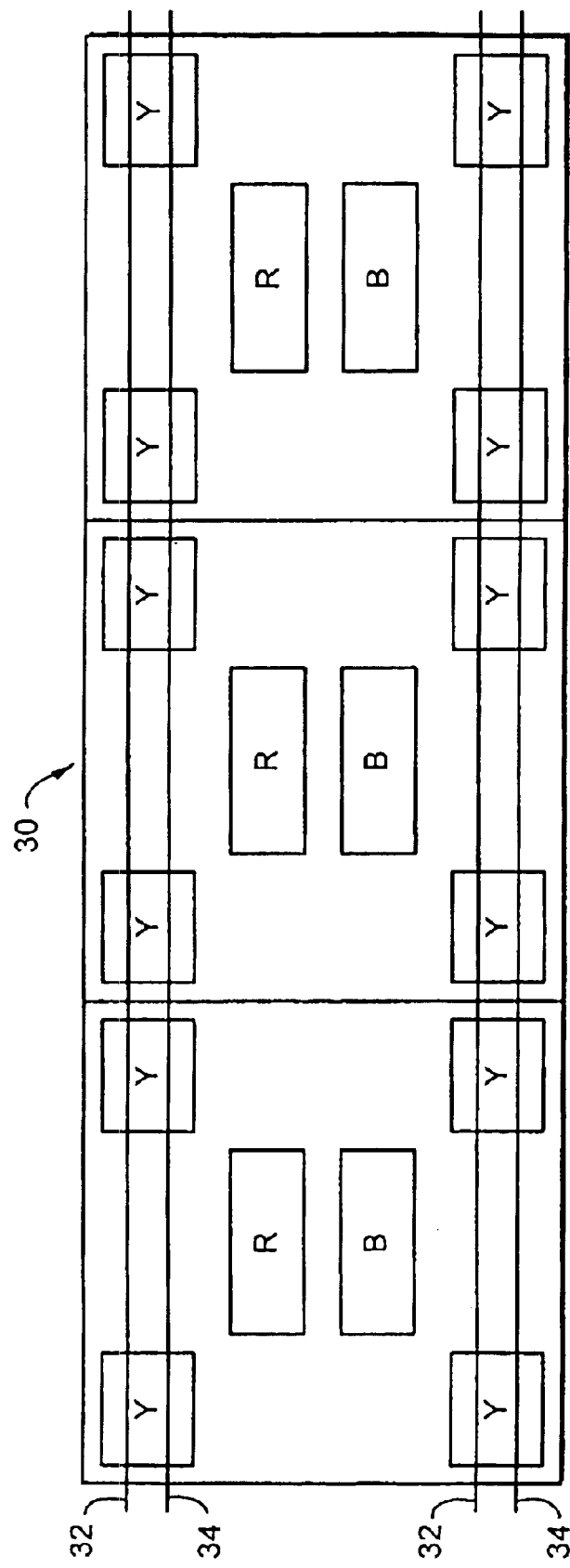
FIG. 3 schematically illustrates a third embodiment of the present invention.

A third embodiment (30) of the present invention is illustrated in FIG. 3. In this embodiment green (34) and red (32) stripped filters are disposed lengthwise across the Y areas (and grey pixels) which are disposed in a generally square configuration as in the previously described embodiments. This embodiment is similar to that of either of FIG. 1 or 2 in that for each block there are four grey sensors disposed in a square configuration around centrally disposed red and blue colour filters, the addition being that of the green and red stripped filters across the Y areas. Whilst the grey sensors in this embodiment still take a direct measure of luminance they are corrected for red and blue by the green and red strips and therefore provide a measure of luminance without the need for any calculation as required in embodiments for FIGS. 1 and 2. In other words, the green and blue strips correct for the influence of the central red and blue filters and accordingly yield direct Y measurements.

The present invention may be embodied in other specific forms without departing from its essential attributes. For example, different specific configurations of the various colour/non-colour areas are possible giving analogous results. Accordingly reference should be made to the appended claims and other general statements herein rather than to the foregoing specific description as indicating the scope of invention.

Furthermore, each feature disclosed in this specification (which term includes the claims) and/or shown in the drawings may be incorporated in the invention independently of other disclosed and/or illustrated features. In this regard, the invention includes any novel features or combination of features disclosed herein either explicitly or any generalisation thereof irrespective of whether or not it relates to the claimed invention or mitigates any or all of the problems addressed.

The appended abstract as filed herewith is included in the specification by reference.

What is claimed is:

1. An image sensing device having an array of image sensors and a filter structure disposed in relation to the image sensors, the filter structure comprising blocks of filter groups, each block of filter groups being arranged in a repeating pattern adjacent to one another, each block having a filter group comprising a combination of one or more areas adapted so as to allow light to pass therethrough onto corresponding image sensors with colour filtering, and one or more areas adapted so as to allow light to pass therethrough onto corresponding image sensors without colour filtering, wherein said one or more areas adapted so as to allow light to pass therethrough onto corresponding image sensors with colour filtering comprise two colour filters, wherein said one or more areas adapted so as to allow light to pass therethrough onto corresponding image sensors without colour filtering comprise four filterless areas or non-colour filters, wherein the filters are arranged such that in each repeating and adjacent filter block there are two colour filters for every four filterless/non-colour filters.

2. An imaging device according to claim 1, wherein the two colour filters are one each of red and blue filters.

3. An imaging device according to claim 1, wherein the colour filters are arranged to be centrally located in relation to the filterless/non-colour filters.

4. An imaging device according to claim 1, wherein the arrangement of said areas in each block of filter groups in the filter structure comprises stripline formation of said respective areas.

5. An imaging device according to claim 1, wherein the image sensors are CMOS sensors.

6. An imaging device according to claim 1, wherein said one or more areas adapted so as to allow light to pass therethrough onto corresponding image sensors without colour filtering include one or more colour filters disposed at least partially thereover.

7. An imaging device according to claim 1, wherein said one or more colour filters disposed over the one or more areas adapted to allow light to pass therethrough without colour filtering comprise colour filter strips.

8. An image sensing device according to claim 1, wherein said colour filtering areas are disposed centrally in the filter group and said areas without colour filtering are disposed in a generally square like configuration around the central colour filters.

* * * * *